United States Patent [19]

Mizoguchi et al.

[11] Patent Number: 5,381,221
[45] Date of Patent: Jan. 10, 1995

[54] DOT IMAGE FORMING APPARATUS HAVING CONTROLLED DOT ADHESION

[75] Inventors: Yoshimi Mizoguchi; Hiroshi Ishii; Kiyoshi Kimura; Masakazu Fukuchi; Makoto Takeda, all of Hachioji, Japan

[73] Assignee: Konica Corporation, Tokyo, Japan

[21] Appl. No.: 955,362

[22] Filed: Oct. 1, 1992

[30] Foreign Application Priority Data

Oct. 17, 1991 [JP] Japan .................................. 3-269594
Feb. 25, 1992 [JP] Japan .................................. 4-038028

[51] Int. Cl.⁶ ............................................ G03G 21/00
[52] U.S. Cl. .................... 355/326 R; 346/157; 355/208; 355/214; 358/448
[58] Field of Search ............... 355/208, 233, 326 R, 355/210, 327, 245, 246, 214; 346/157, 108, 160; 358/447, 448

[56] References Cited

U.S. PATENT DOCUMENTS 4,814,797 3/1989 Haneda et al. .
4,939,529 7/1990 Kanayama et al. ................. 346/108
4,967,211 10/1990 Colby et al. ......................... 346/160
5,162,820 11/1992 Yamamoto et al. ............. 346/160 X

FOREIGN PATENT DOCUMENTS

3610465A1 10/1986 Germany .
63-288562 11/1988 Japan .
63-303373 12/1988 Japan .
3-246574 11/1991 Japan .

OTHER PUBLICATIONS

Patent Abstracts of Japan, vol. 014, No. 248 (E-0933) May 28, 1990 & JP-A-02 070 173 (Fuji Xerox Co., Ltd) Mar. 9, 1990.
Patent Abstracts of Japan, vol. 013, No. 429 (E-823) Sep. 25, 1989 & JP-A-01 160 182 (Canon Inc) Jun. 23, 1989.
Patent Abstracts of Japan, vol. 013, No. 460 (P-946) Oct. 18, 1989 & JP-A-01 179 172 (Ricoh Co., Ltd.) Jul. 17, 1989.

Primary Examiner—A. T. Grimley
Assistant Examiner—Shuk Y. Lee
Attorney, Agent, or Firm—Frishauf, Holtz, Goodman & Woodward

[57] ABSTRACT

In an image forming machine in which a latent image is formed on an image carrier using an exposure device corresponding to an image forming signal, and a toner image is formed by a developing device using toners, there is provided with a first adjustment device by which an adhesion amount of toner is adjusted, a discriminator by which an isolated dot or an edge dot is discriminated, a second adjustment device by which an adhesion amount of toner is adjusted according to a discrimination result by the discriminator, and a controller by which the adjustment conditions of the adhesion amount of the second adjustment device differ corresponding to the discriminated isolation dot or edge dot, and areas other than the discriminated dots.

40 Claims, 13 Drawing Sheets

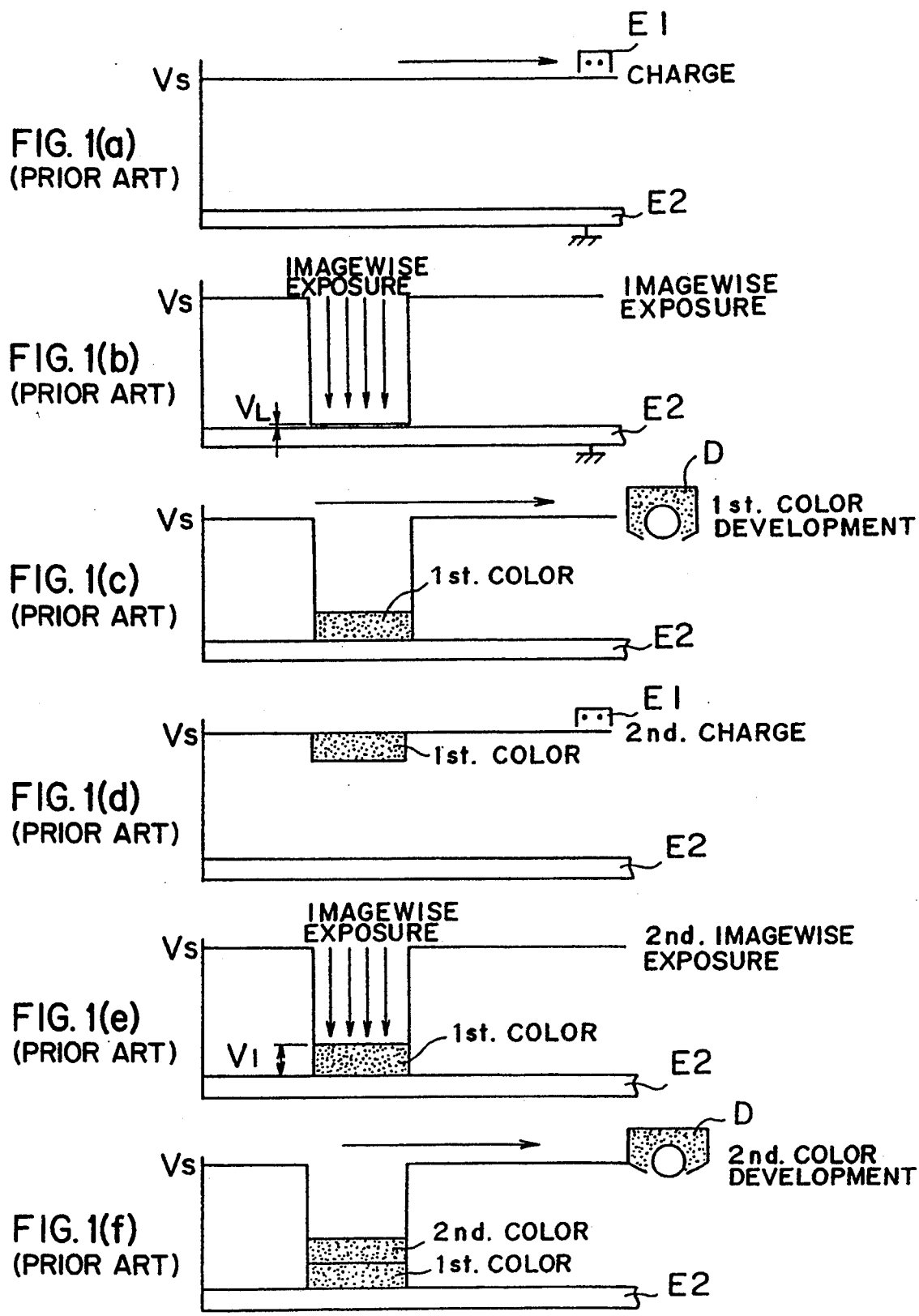

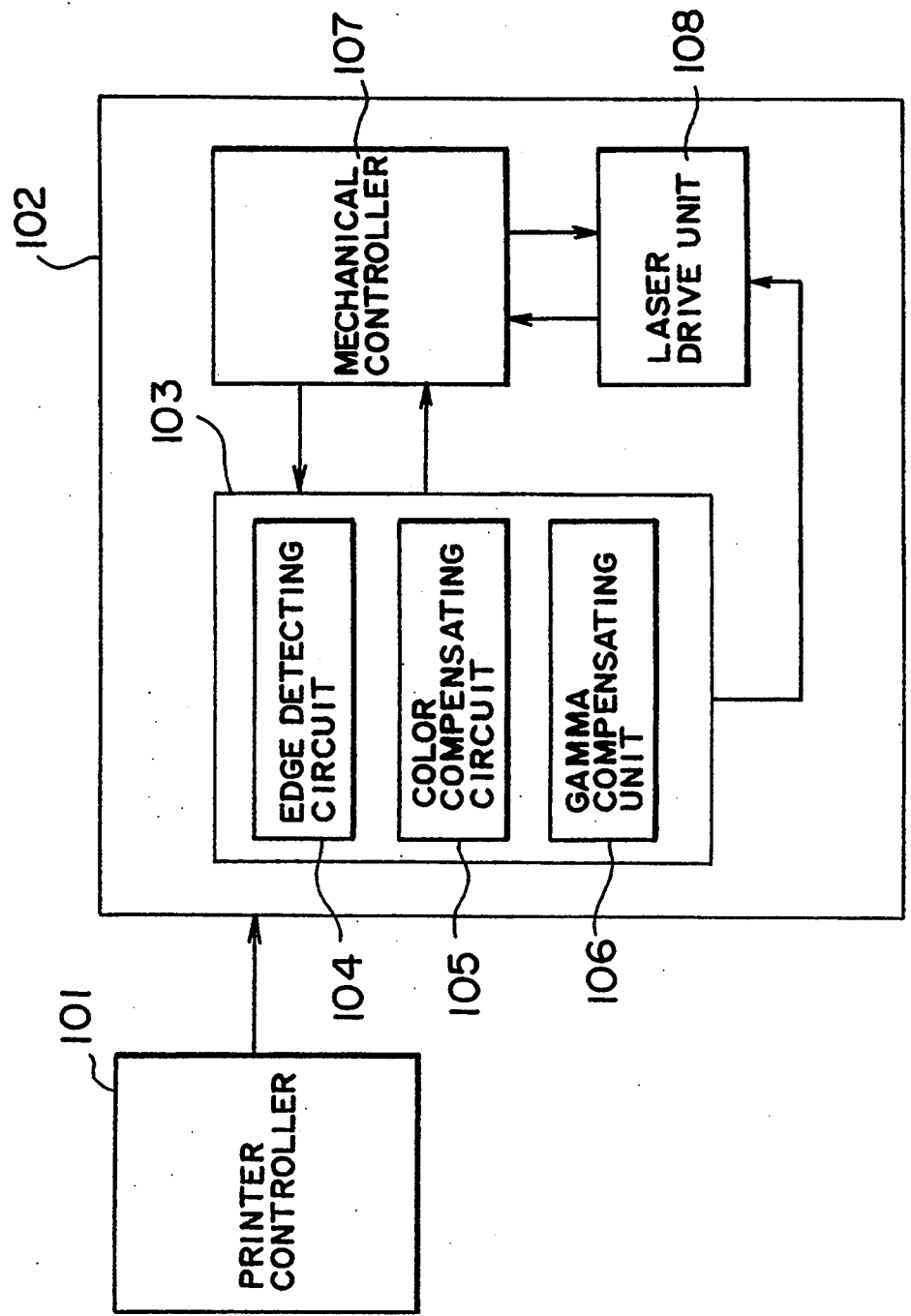

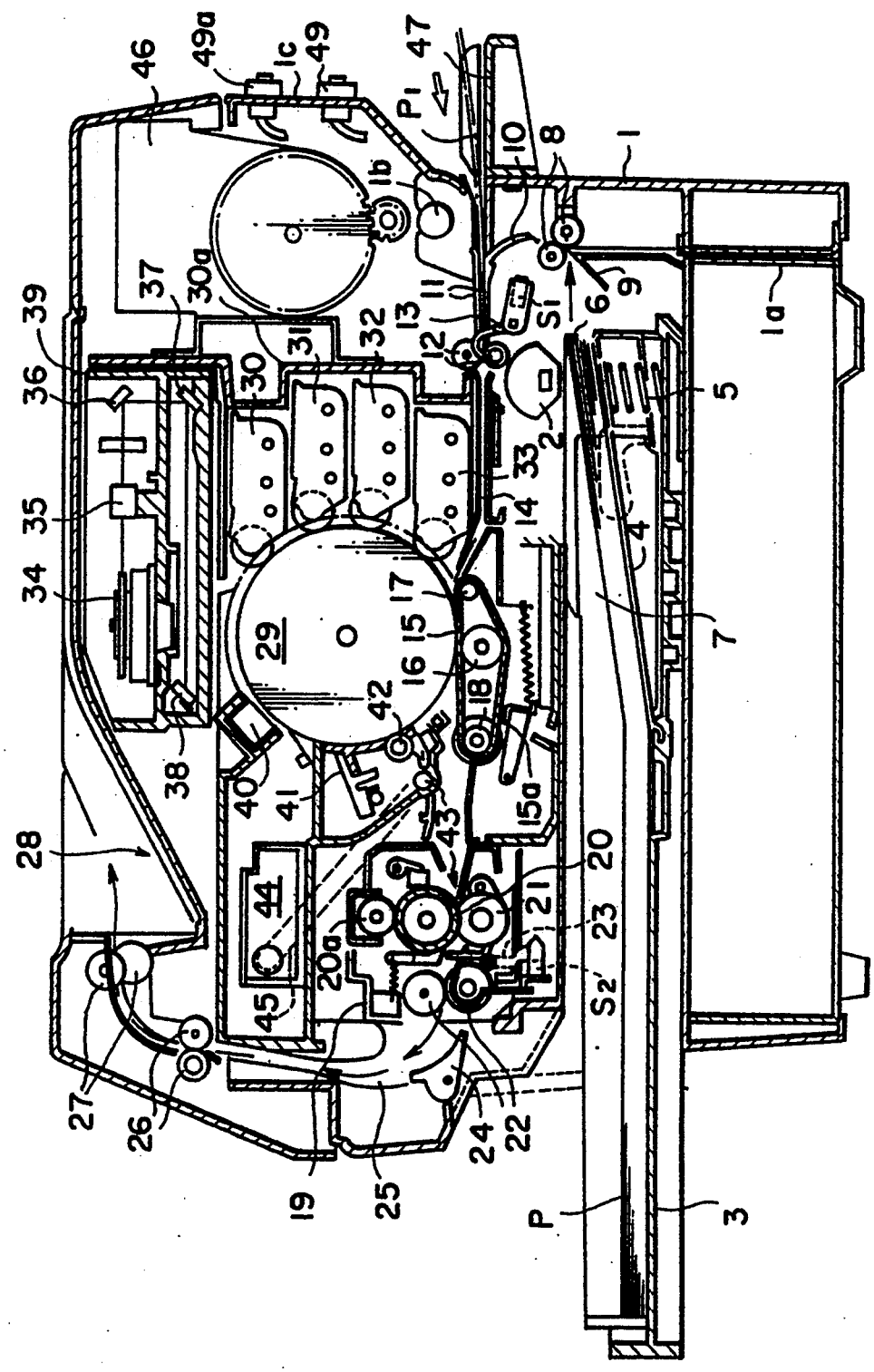

DOT IMAGE FORMING APPARATUS HAVING CONTROLLED DOT ADHESION

BACKGROUND OF THE INVENTION

The present invention relates to an image forming apparatus, for example, a color image forming apparatus in which a pattern-shaped electrostatic latent image is formed on an image carrier using a laser beam source, and a plurality of developing processes by color toners are repeated, and especially to an image forming apparatus in which a plurality of color toners are used so that a color image is formed, at which time an isolated dot or an edge dot is detected, and exposing conditions are respectively changed so that an accurate color image or monochromatic image can be obtained.

A color image forming method in which color toners are superimposed on each other by a conventional electrophotographic method so that an intended color image can be obtained will be explained as follows. At first, as shown in FIG. 1(a), the image carrier E2, which forms a color toner image, is charged at first time by a charger E1 so that the surface potential of the image carrier becomes $V_S$. Next, only the portion on which an image, that is, a character or a line image, is formed, is imagewise-exposed by the laser beam, as shown in FIG. 1(b). After an imagewise exposure has been completed, only the exposed portion is discharged and the surface potential $V_S$ is lowered to $V_L$, and the non-image portion is not discharged. Next, as shown in FIG. 1(c), the image carrier E2 is moved in the arrowed direction and a first color development is conducted by a developing unit D. The charge is eliminated well-type-potential-like by the imagewise exposure as shown in FIG. 1(b), and the first color toner is adhered to the eliminated portion, and developed so that the first color toner image is formed. Next, the second charging is conducted by the charging electrode E1 on the image carrier including the first color toner image portion (re-charging). The surface potential of the image carrier is controlled so that the surface potential becomes almost the same potential as that at the time of the first charging. For explanation, the first color toner image is shown in the following way: the first color toner image is separated from the image carrier E2; and it is shown at the position of the portion of the surface potential $V_S$. Next, as shown in FIG. 1(e), when the second imagewise exposure is conducted on the first color toner image, the electric charge only at the imagewise exposure portion is eliminated well-type-potential-like in the same manner as that shown in FIG. 1(b). The light of the second imagewise exposure is transmitted through the first color toner and arrives at the image carrier. The surface potential of that portion becomes $(V_L + V_1)$, in which the potential $V_L$ of the exposed portion is added to the potential $V_1$ of the toner image. The second color toner is superimposed on the first color toner on the image carrier E2 as shown in FIG. 1(b), and developed by the developing unit D. When the third color is developed, re-charging, imagewise exposure, and the development is repeatedly conducted. The foregoing is a basic process by which a color image is formed on the image carrier when color toners are superimposed.

The above-described color toner image formation by the superimposition of toners is conducted by an apparatus into which image information is inputted through an interface circuit from the outside of the apparatus and in which necessary processing is conducted and the image information is recorded, that is, by an electrophotographic printer in which the image carrier is a photoreceptor. Of course, it may be a color copying apparatus in which a color document is read-out, and after it is converted into an electric signal, the signal is recorded in a recording section and copied. For example, the system which is shown in FIG. 2(a) is composed of a host unit 100 in which a computer (which will be called a CPU, hereinafter) is built-in and a display or the like is provided, a printer controller 101, and a laser printer section 102. The image information such as a character, line, or solid image which is recorded in a recording section in the CPU, and is stored in a magnetic storing means, is outputted to the printer controller. After a video signal from the printer controller 101 is processed for color recording, a recording signal is made, and thereby a semiconductor laser beam is modulated so that the image signal is recorded by the laser printer 102. The system is structured in the following manner: for example, red letters A are successively outputted in a dot image; only a character portion is inputted into the laser printer 102 in a dot signal; and the toner images are formed by the laser printer 102 in order of FIGS. 1(a), (b), (c), (d), (e), and (f).

A pulse width modulation method in which the recording signal is converted into a pulse width in one pixel or a plurality of pixels, and is used for a laser beam modulation signal, and an intensity modulation system in which laser beam radiation intensity is converted into strength, and the size of a recording dot diameter is formed, are used as a semiconductor laser beam modulation system. They are used for the modulation method of the imagewise exposure of the color toner superimposition type. This is convenient when the sizes of the recording dots of the first color and the second color are changed.

For example, when the color of red is prepared by yellow and magenta, it is necessary to adjust the color delicately depending on the cases where yellow is strengthened and magenta is weakened, or the adverse of that, and therefore, the exposure condition is changed and a mixing ratio by the superimposition of color toners is adjusted, so that an intended color image can be obtained. In the above-described color image formation, there is a disadvantage in that: especially at the time of exposing on the first color toner, when exposing is conducted for the second color, the first color toner layer affects it greatly, so that development control of the color toner is difficult.

The above-described color tone control has the following disadvantages: the image signal which is a dot signal, or a dot line, both are character images, or a solid image signal, is outputted from the CPU in FIG. 2, as shown in FIG. 3, to the printer controller 101, and the color tone of any one of them is preferably the same as that of the other two in any image pattern. However, the above-described color tone control method can not always change the color tone to the same degree as the other two. For example, what is called a pulse width modulation system in which lighting time of the exposure unit is changed, will be explained as follows referring to FIG. 3. When the signal is inputted successively from the left in FIG. 3(b), the following operations are conducted: at first, the dot signal is inputted; the solid image signal is inputted after some interval; and the inputted signal is outputted as a video signal from the printer controller 101 to the control section of the laser printer 102.

The above-described video signal is converted into pulse signals by the pulse modulation circuit (not shown in the drawings) in the laser printer 102 control section, and an ON signal corresponding to a dot output signal is generated and a pulse having a constant width is formed. Next, a solid image video signal is inputted into the laser printer 102 after an several interval, and when a pulse signal having a constant width and a constant interval is turned on, the solid image output signal is outputted. For example, when a duty ratio of the exposure unit is adjusted to 50% in order to limit an adhered amount of the first color, and it is adjusted to 100% for the second color, at the time when distribution of the optical energy density which is received by the photoreceptor, a large difference of energy density is generated between the 50% duty ratio in the case of a dot, and the 50% duty ratio in the case of a solid image. That is, in the case of the solid image, an energy amount is a total of the energy of dots which are close to each other. Therefore, an average energy of the solid image is larger than that of an independent isolated dot, one dot line, or an edge area (which is called a dot area, hereinafter) of the solid image area. Accordingly, the difference of the optical energy of the solid image area between the case of 50% duty ratio and the case of 100% duty ratio is reduced as shown in FIG. 3(a). In this condition, when the surface potential curve according to which the image carrier shown in FIG. 1 is exposed, as shown in FIG. 3(b), the difference of the surface potential between the case of 50% duty ratio and the case of 100% duty ratio is $\Delta VS_1$, which is large. That is, the surface potential in the case of 100% duty ratio is higher than that in the case of 50% duty ratio by $\Delta VS_1$.

In contrast to such a condition, even when the electric charge is eliminated by the image exposure of the solid image in the case of the 50% duty ratio and in the case of the 100% duty ratio, the difference of the surface potential of the solid image is $\Delta VS_2$, as shown in the drawing, which is very small. After the above-described charging, image exposure processing, and developing processing are conducted, when the image forming processing shown by FIGS. 1(c), (d), (e), (f) is conducted, the condition of electric charge elimination by the imagewise exposure with a 50% duty ratio, is shown in FIG. 3(c). In the dot area and the solid image area, since the potential drop of the dot area is small, when developing is conducted by the developing unit D as shown in FIG. 4(a), an adhered amount of toner is very small, and since the potential drop of the solid image area is large, toner is fully adhered to the area. Next, charging is conducted again on the toner image in the first color development as shown in FIG. 4(b), and the second imagewise exposure of 100% duty ratio is conducted for the second color development as shown in FIG. 4(c). In this case, since the adhered amount of toner in the dot area is small on the image carrier E2 when the first color is developed, large energy is projected when the second color is imagewise exposed, and therefore, the potential is greatly lowered. Since the adhered amount of toner of the solid image area is large, and the projected amount of the optical energy is small when the second color is imagewise exposed, the potential drop is smaller than that of the dot area as shown in the drawings. Thus, when the duty ratio % is small, a large difference is produced in the lowering of the potential between the dot area and the solid image area. In this case, when the second color toner is developed by the developing unit E1, since the electric charge of the dot area is largely eliminated, a large amount of toner is adhered to the dot area compared to the solid image area. FIG. 4(d) shows the case where a duty ratio at the time of the second color imagewise exposure is larger than that at the time of the first color imagewise exposure (50%→100%). In this case, the adhered amount of the second color toner is much larger than that of the first color toner, and the color tone of the dot area is different from that of the solid image area, and therefore, color adjustment is necessary. In this case, there is a disadvantage in that the color tone of the dot area is different even when the adhered amount of the first color and that of the second color of the solid image area is almost equal and the desired color image is obtained.

In other color tone control methods, there is a method in which developing conditions are changed at each color and an amount of developing toner is controlled, however, in this method, the adhered amount of toner is different also depending on the image pattern, so that the color tone is changed. For example, in the developing method in which an A.C. voltage is impressed upon the developing bias voltage, an amount of the developing toner can be controlled by changing the value of the A.C. voltage. However, the following result has been found: when the A.C. voltage is increased, an amount of the developing toner of the dot or the line is greatly increased compared with that of the solid image. Accordingly, the color tone of the solid image is different from that of the dot or the line. Further, in the monochrome image, when the image density adjustment is conducted, there is a case where blocking, blurring, and breaking of the character are generated even when desired density of the solid image area is obtained. In color image reproduction, even when the desired color of the solid image was reproduced at the time of color adjustment, there were cases where the desired color of the edge area of the solid image, the dot, or the line was not reproduced.

Furthermore, when the color adjustment is conducted at the time of the color image reproduction, there is a disadvantage in that resolution is changed, the character becomes unclear, and thus the image quality is deteriorated.

SUMMARY OF THE INVENTION

The object of the present invention is to reproduce all of the solid image area, the dot area, the character and the fine line clearly at the time of density adjustment of the monochrome image. Further, the object of the present invention is to reproduce all of the solid image area, the dot area, the character and the fine line into the same colors when the desired color is reproduced by color adjustment at the time of color image reproduction.

The above-described object is accomplished by an image forming apparatus in which a latent image is formed on an image carrier using an exposure means corresponding to an image forming signal, and a toner image is formed by a developing means using toners, a first adjustment means by which an adhesion amount of toner is adjusted a discrimination means by which either an isolated dot or an edge dot is discriminated from other area, and a second adjustment means by which an adhesion amount of a toner image are adjusted according to a discrimination result by the discrimination means, and a control means by which the adjustment conditions of the adhesion amount of the second adjustment means differ corresponding to the discriminated isolation dot or edge dot, and areas other than the discriminated dots. Further, the above-described object is accomplished by an image forming apparatus in which the latent image is formed on the image carrier using the exposure means corresponding to the image forming signal, and the toner image is formed by the developing means using toners, and the control means comprises: a first adjustment means by which an adhesion amount of a first toner image and a second toner image are adjusted in toner image formation by which a color toner image is formed by superimposing toner images successively, a discrimination means by which an isolated dot or an edge dot is discriminated, a second adjustment means by which an adhesion amount of the first toner image and the second toner image are adjusted corresponding to the discrimination result by the discrimination means, and a control means by which the adjustment conditions of the second adjustment means differ corresponding to the discriminated isolation dot and other discriminated dot areas.

BRIEF DESCRIPTION OF THE DRAWINGS

FIGS. 1(a), 1(b), 1(c), 1(d), 1(e) and 1(f) are views showing processes of an image forming means to which a conventional two times developing method of charging, exposing, controlling, and developing is applied.

FIGS. 2(a), 2(b) and 2(c) are views showing locations from a CPU to a laser printer in the image forming apparatus.

FIG. 6 is a vertical sectional view of the image forming apparatus to which an image forming means of the present invention is applied.

DETAILED DESCRIPTION OF THE PREFERRED EMBODIMENT

Figure 2A:
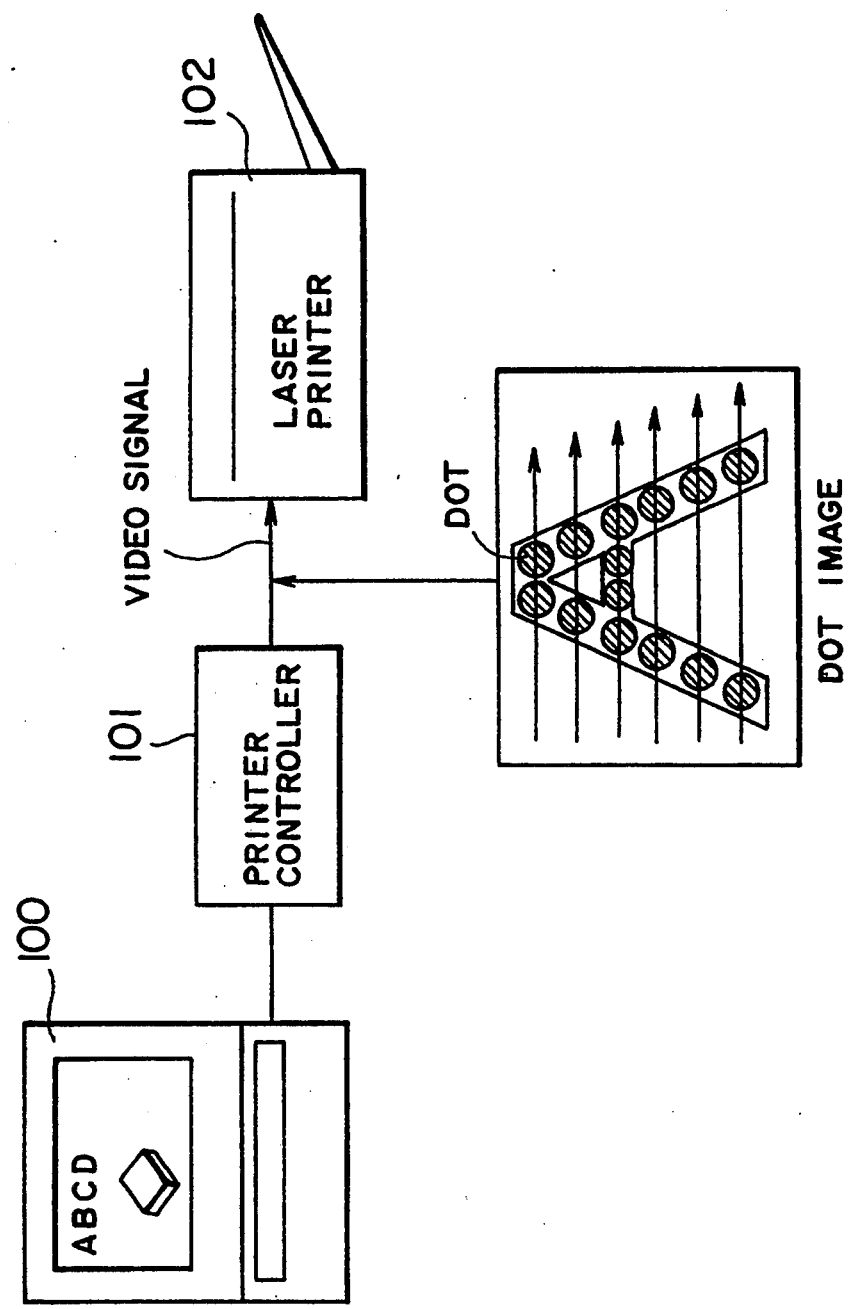
Figure 2B:
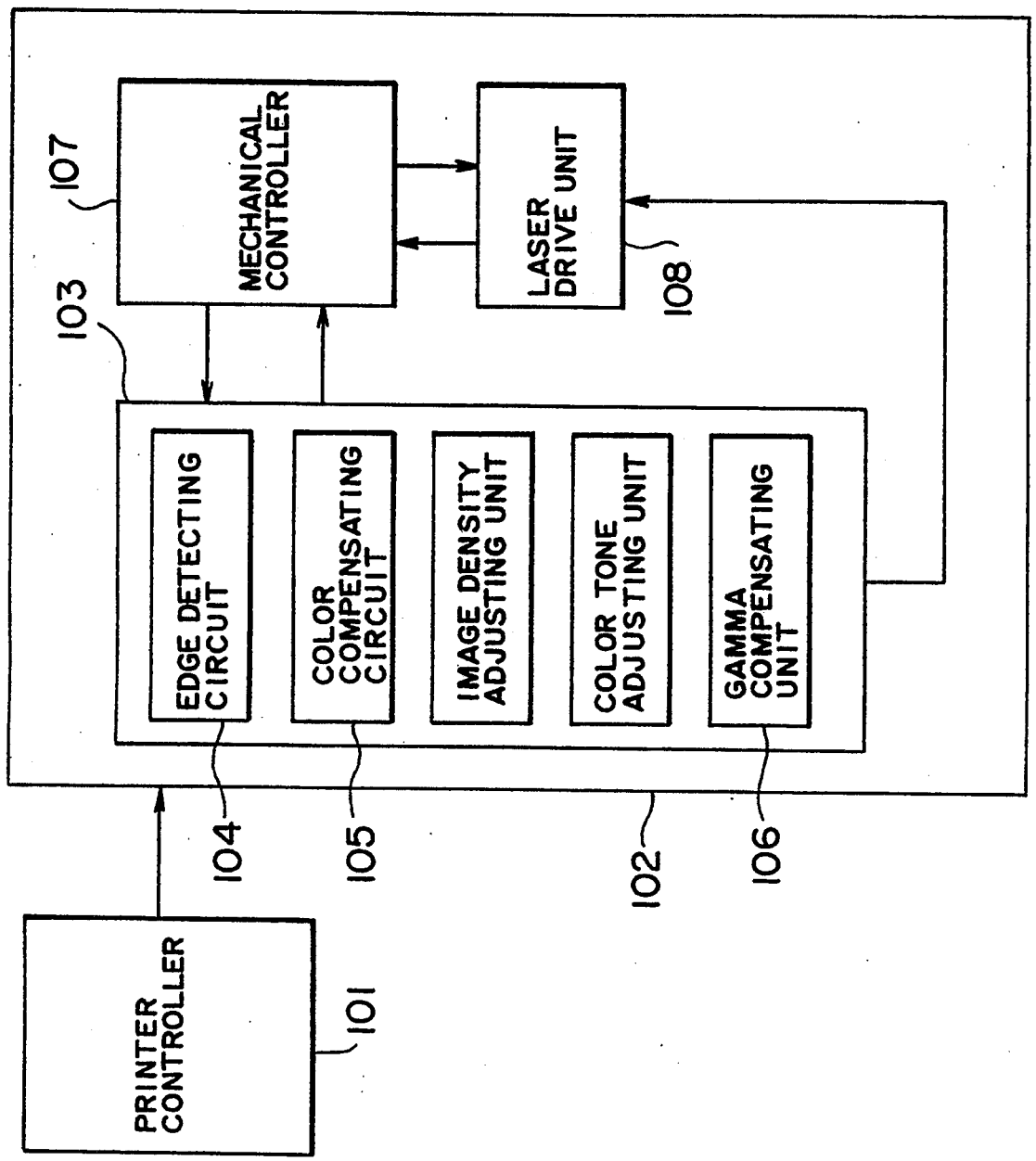
Figure 3A:
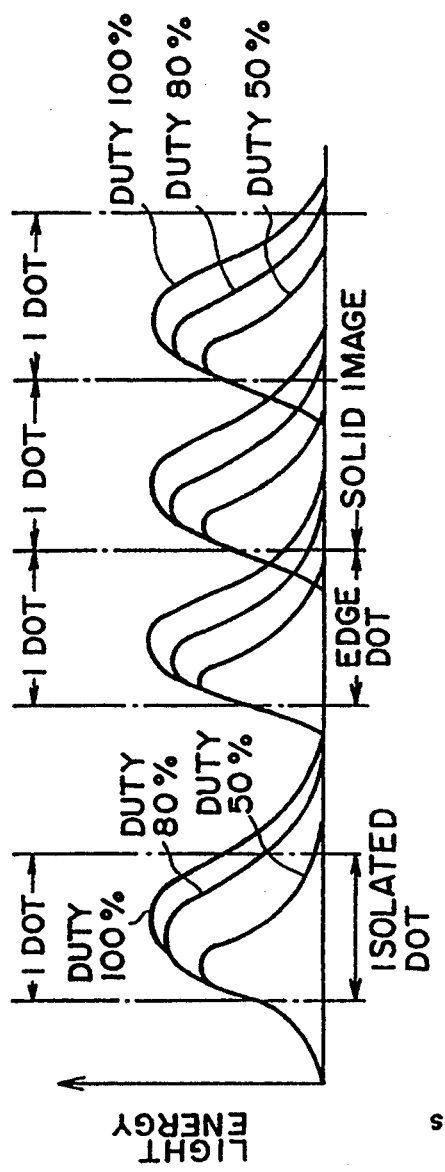
FIGS. 3(a), 3(b) and 3(c) are views showing exposure control in a dot image and a solid image.
Figure 3B:
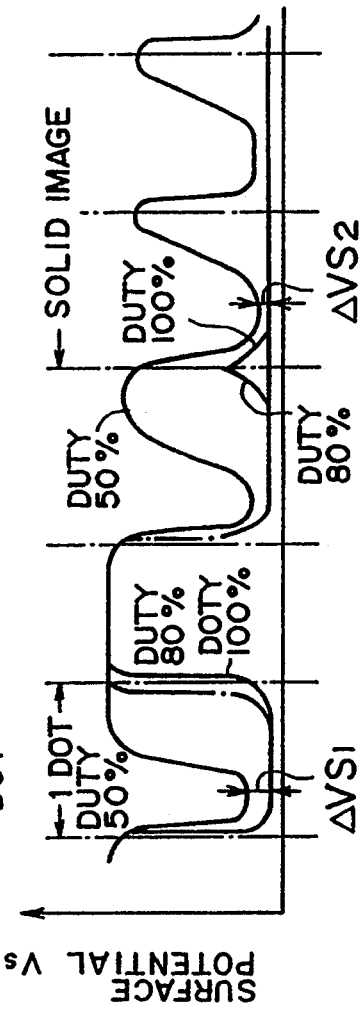
Figure 3C:
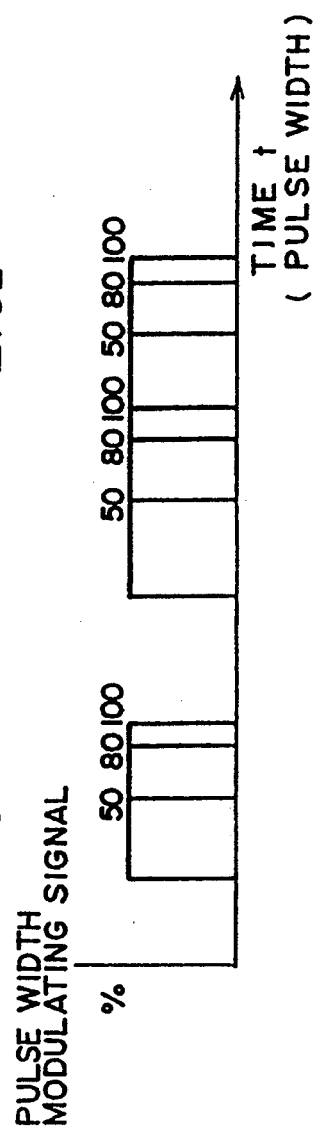
Figure 4A:
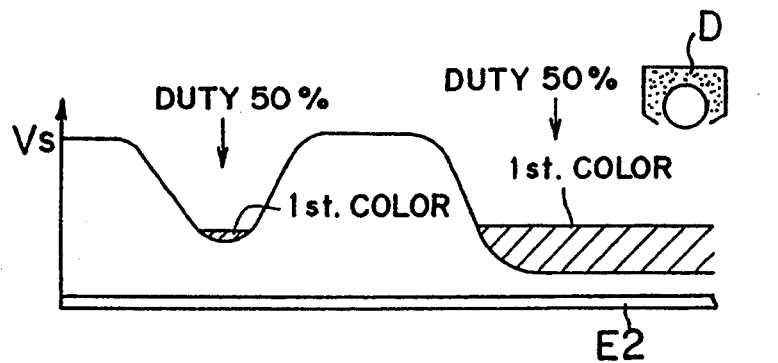
FIGS. 4(a), 4(b), 4(c) and 4(d) are views showing conventional development of color toners in the dot image and the solid image.
Figure 4B:
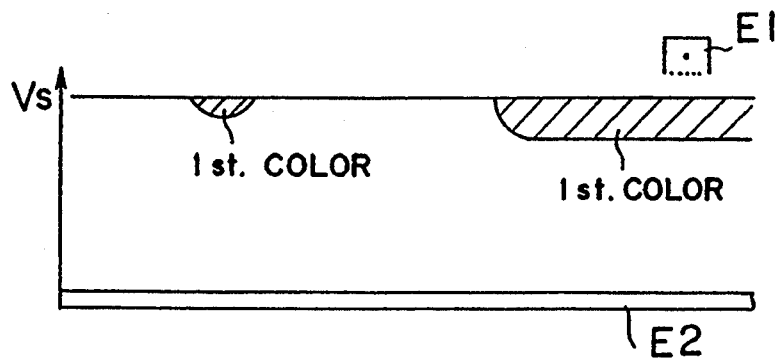
Figure 4C:
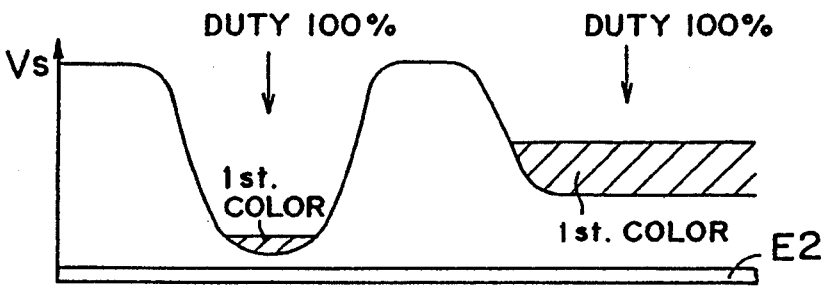
Figure 4D:
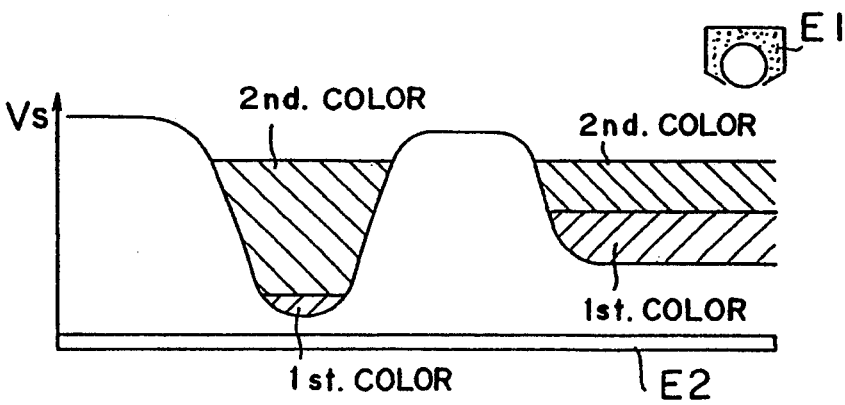

In FIG. 6, at first, the entire surface of an image carrier 29 is charged by a charging electrode 40 of a scorotron system. Next, as shown in FIGS. 2(a), and 2(b), a character, a line, and a dot line are outputted as a dot signal and a solid image area is outputted as a solid image signal in a video signal from a printer controller 101, and a first color is outputted as an image signal in which both signals are mixed. A means by which the dot signal or the solid image signal is selected is used in this system. The video signal outputted from the printer controller 101 is received by a control means in a laser printer 102. In the control means in the laser printer 102, as shown in FIG. 2(b), an image signal processing unit 103 having an edge detecting circuit 104, a color compensating circuit 105, an image density adjusting unit, a color tone adjusting unit and a gamma compensating unit 106, is built-in, and further a mechanical controller 107 and a laser drive unit 108 are provided.

In the structure described above, for example, when character A shown in FIG. 2(a) is outputted in the form of a dot image in the video signal, an edge area is detected by an edge detecting circuit 104. In the edge detecting circuit, a matrix composed of 3×3 pixels is used, and the edge detection circuit discriminates whether a target pixel belongs to an isolated dot or an edge area, or does not belong to the edge area at each pixel, corresponding to a density change with respect to an adjoining pixel in a primary scanning direction and a subsidiary scanning direction. Further, a color recording image is compensated by the color compensating circuit 105, gamma is compensated by the gamma compensating circuit, input/output control is conducted between the image signal processing unit 103 and the mechanical controller 107, and further, input/output control is conducted also between the mechanical controller 107 and the laser drive unit 108. The signal which discriminated whether the target pixel belongs to the isolated dot or the edge area, or does not belong to the edge area at each pixel, is sent to the laser drive unit 108. In the laser drive unit 108, exposure is conducted by controlling a laser light source in the following manner: the above-described signal is sent to the laser printer 102 as an electric signal corresponding to the isolated dot or the edge dot, or the solid image signal; in the case of the dot image, exposure is conducted by a laser beam modulation signal so that a pulse width $L_1$ can be a duty ratio 40% to 100%; and in the case of the solid image, exposure is conducted so that a modulated pulse width $L_2$ of the laser light can be a duty ratio of 20% to 100% for a constant period of time as described above.

The isolated or edge dot area is preferably exposed so that a duty ratio can be 50% to 100% with respect to a full pixel of 100%, and the solid image is preferably exposed so that a duty ratio can be 30% to 100% with respect to a full pixel of 100%.

Figure 5A:
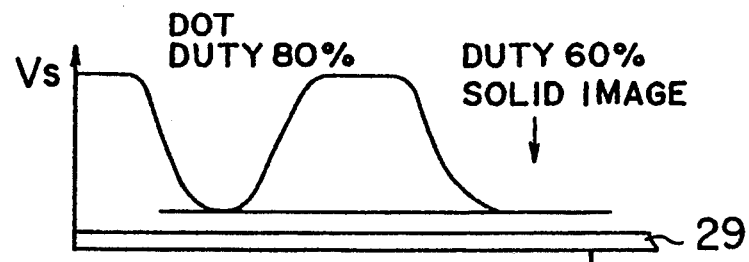
FIGS. 5(a), 5(b), 5(c), 5(d), 5(e) and 5(f) are views showing color toner development of the present invention in the dot image and the solid image.
Figure 5B:
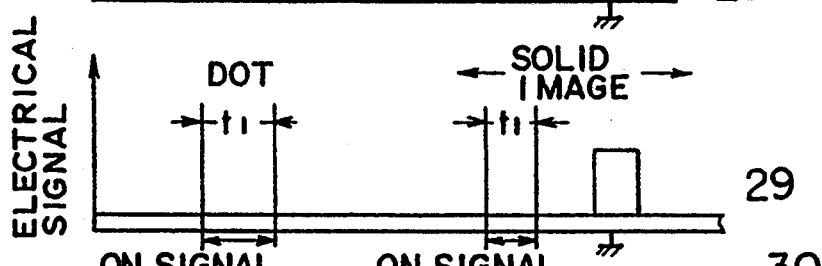
Figure 5C:
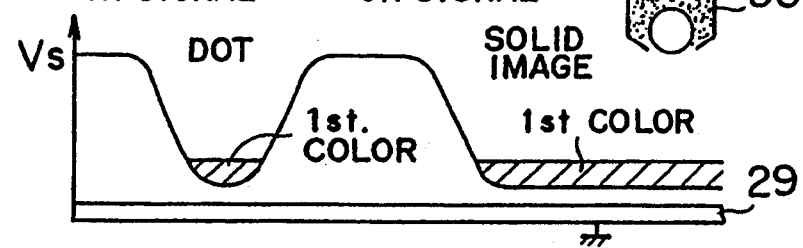
Figure 5D:
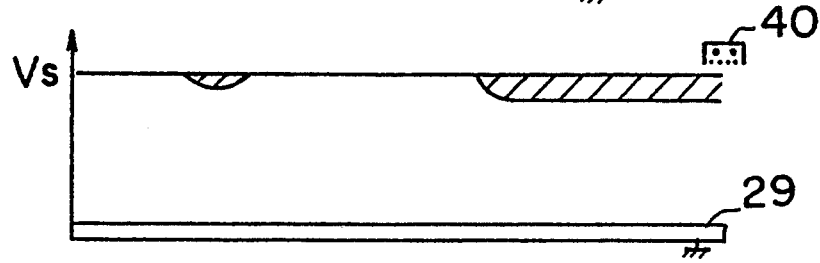
Figure 5E:
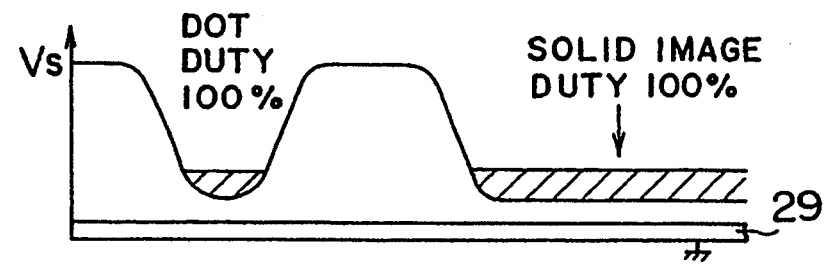
Figure 5F:
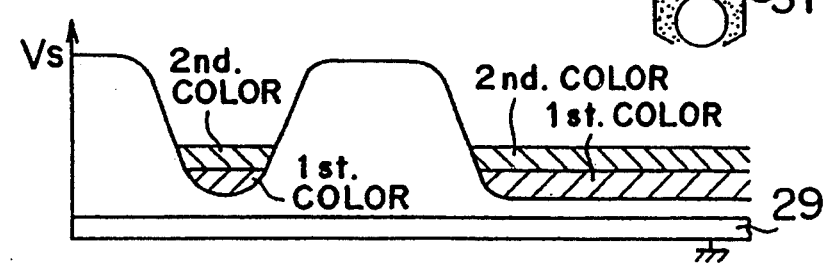

As shown in FIG. 5(a), when the dot image area of the isolated dot or edge area is imagewise-exposed by the laser modulation pulse width of a duty ratio of 80%, and the solid image area is imagewise-exposed by the laser modulation pulse width of a duty ratio of 60%, the potential on the image carrier becomes almost the same level in the case of the dot image area of the isolated dot or edge area, or in the case of the solid image area. When development is conducted by the developing unit 30 under this condition, as shown in FIG. 5(c), the first color toner is developed with almost the same amount of toner adhesion in the case of the dot image area of the isolated dot or edge area, as that in the case of the solid image area. Next, the entire surface of the image carrier is charged again by the charging electrode 40 located above the image carrier so that the electric charge is given to the surface of the image carrier, and both the dot image area of the isolated dot or edge area, and the solid image are imagewise-exposed by the laser modulation pulse width with a duty ratio of 100%. As described above, when the first color is imagewise-exposed, the duty ratio of the laser modulation pulse width of the dot image area of the isolated dot area or the edge area is selected to be larger than that of the dot image area of the solid image area, and when the second color is imagewise-exposed, both the duty ratios are 100%, and thereby, the adhesion amount of toner at the time of toner image development becomes almost equal in the case of the dot image area of the isolated dot or the edge area, and in the case of the solid image area, so that a potential lowering of the second color becomes almost the same. Therefore, as shown in FIG. 5(f), even when development is conducted by the developing unit 31 for the second color finally, the adhesion amount of the toner can be almost the same in both cases, and can be the same as that of the first color.

Next, another example will be explained as follows. In FIG. 6, the means in which the entire surface of the image carrier 29 is charged by the charging electrode 40 of a scorotron system, is the same as that in FIG. 1(a). Next, the character, the line, and the dot line are outputted in the form of a dot in the video signal outputted from the printer controller 101 as shown in FIGS. 5(a), (b), and the solid image area is outputted as the solid image signal, and the first color is outputted. A means by which the dot signal or the solid signal is selected is used in this system. The video signal outputted from the printer controller 101 is received by a control means in a laser printer 102. In the control means in the laser printer 102, as shown in FIG. 2(c), an image signal processing unit 103 having an edge, which is a dot, detecting circuit 104, a color compensating circuit 105, and a gamma compensating unit 106, is built-in, and further a mechanical controller 107 and a laser drive unit 108 are provided therein. In the structure described above, for example, when character A shown in FIG. 2(a) is outputted in the form of a dot image in the video signal, an edge area is detected by an edge detecting circuit 104. By the edge detecting circuit, a matrix composed of 3×3 pixels is scanned, and the edge detection circuit discriminates whether a target pixel belongs to an edge area, or does not belong to the edge area, at each pixel. Further, a color recording image is compensated by the color compensating circuit 105 and gamma is compensated by the gamma compensating circuit 106, input/output control is conducted between the image signal processing unit 103 and the mechanical controller 107, and further, input/output control is conducted also between the mechanical controller 107 and the laser drive unit 108. The signal which has discriminated whether the target pixel belongs to the edge area, or does not belongs to the edge area, at each pixel, is sent to the laser drive unit 108. In the laser drive unit 108, exposure is conducted by controlling a laser beam source in the following manner: the above-described signal is sent to the laser printer 102 as an electric signal corresponding to the dot image, or the solid image signal; in the case of the dot image, exposure is conducted by an ON signal of a laser beam so that a pulse width $L_1$ can be a duty ratio of 80%; and in the case of the solid image, exposure is conducted by the ON signal so that a modulated pulse width $L_2$ of the laser light can be a duty ratio of 60% for a constant period of time as described above.

When the above-described pulse width is used, the duty ratio of the dot area is 80%, and that of the solid image area is 60%, and thereby, the electric charge $V_S$ of the image carrier 29 is eliminated.

As shown in FIG. 5(a), the electric potential on the image carrier when the electric charge is eliminated, is the same in both the cases of the dot area and the solid image area. When development is conducted by the developing unit 30 under this condition, as shown in FIG. 5(c), the thickness of the first color toner of the dot area is the same as that of the solid image area.

The electric charge is given to the entire image including the dot area and the solid image area by the charging electrode 40 located above the image carrier, and the electric charge of the dot area and the solid image area is eliminated by conventional exposure whose duty ratio is 100%. In this case also, since the thickness of toner of the dot area is the same as that of the solid image area when the development is conducted, an attenuation ratio of the electric potential by electric charge elimination is the same in both cases. As shown in FIG. 5(f), when development is conducted finally using the second color developing unit 31, the thickness of toner of the dot image area and the solid image area is the same as that in the case of the first color, and therefore, the color image can be adjusted by the desired color.

Figure 10:
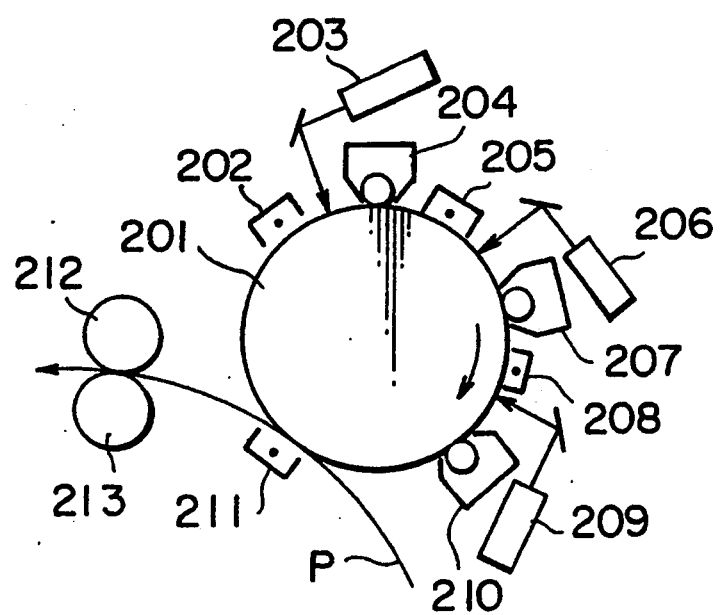
FIG. 10 is a view showing an image forming apparatus to which another example using the image forming means of the present invention is applied.

FIG. 10 shows another example to which the color image forming process of the present invention is applied. In the example, the first image forming means composed of a charging electrode 202, an exposure means 203, and a developing section 204, the second image forming means composed of a charging electrode 205, an exposure means 206, and a developing section 207, and the third image forming means composed of a charging electrode 208, an exposure means 209, and a developing section 210 are provided respectively around the photoreceptor drum 201 which is an image carrier. A color toner of yellow is loaded in the developing section 204 of the first image forming means, a color toner of magenta is loaded in the developing section 207 of the second image forming means, and a color toner of cyan is loaded in the developing section 210 of the third image forming means. After the electric charge is given to the photoreceptor drum 201 by the charging electrode 202, the exposure control by the duty ratio is conducted by the exposure means 203 in the same manner as the above-described image forming process, and the color toner of yellow is developed by the developing section 204. At the next stage, charging is conducted on the photoreceptor drum 201 and the color toner of yellow, and an electric charge elimination control by the pulse width control is conducted by the exposure means 209, and the color toner of magenta is developed by the developing section 207. The color toner of cyan of the third image forming means is then superimposed and developed. This method is the method by which image formation is conducted when the photoreceptor drum 201 is rotated by one turn, and the color image is transferred onto a recording sheet P by a transfer electrode 211, and the color toner which is conveyed between a thermal fixing roller 212 and a pressure contact roller 213, is fixed onto the recording sheet P.

Figure 11:
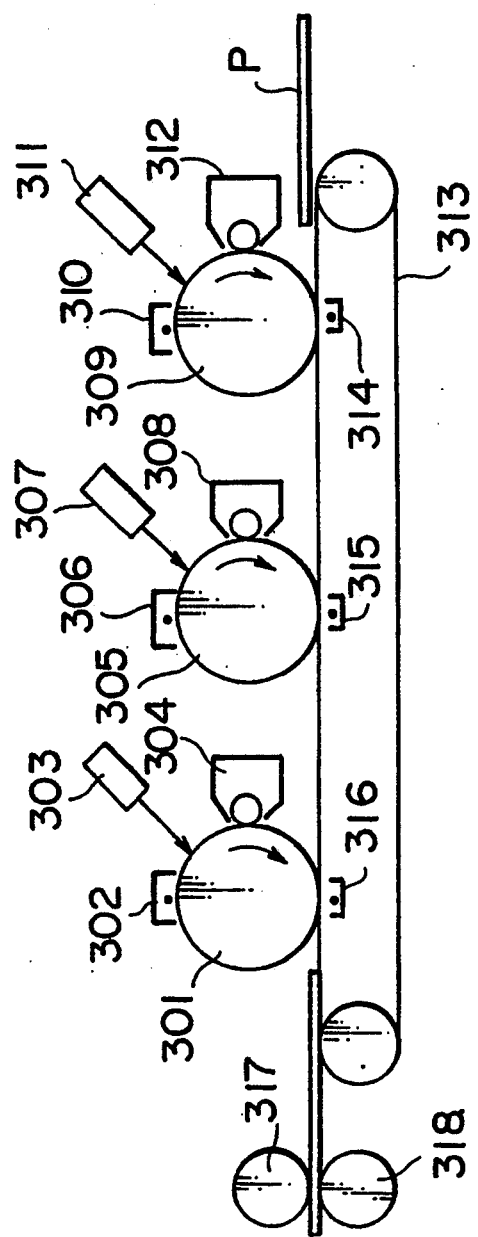
FIG. 11 is a view showing an image forming apparatus to which a further example using the image forming means of the present invention is applied.

Next, the example shown in FIG. 11 is an image forming apparatus to which the color image forming process of the present invention is applied in the same manner as the foregoing. In the example, the first image forming means in which a charging electrode 310, an exposure means 311 and a developing section 312 are provided around a photoreceptor drum 309, the second image forming means in which a charging electrode 306, an exposure means 307 and a developing section 308 are provided around a photoreceptor drum 305, and the third image forming means in which a charging electrode 302, an exposure means 303, and a developing section 304 are provided around a photoreceptor drum 301, are provided, and a recording sheet conveyance belt 313 which is contacted in common with the photoreceptor drum 309 of the first image forming means, the photoreceptor drum 305 of the second image forming means, and the photoreceptor drum 301 of the third image forming means, is provided, and further, transfer electrodes 314, 315, and 316 are provided through the recording sheet conveyance belt in positions opposed to the photoreceptor drums 309, 305, 301, and a yellow developing unit is provided in the developing section 312, a magenta developing unit is provided in the developing section 308, and a cyan color toner developing unit is provided in the developing section 304. When the color image forming process of the present invention is applied to the image forming apparatus, the photoreceptor drum 309, to which the electric charge is given by the charging electrode 310, is exposed by the exposure means 311 by which exposure control by the duty ratio is conducted, a yellow color toner is developed by the developing unit 312, and the recording sheet P is conveyed by the recording sheet conveyance belt 313 when development has been completed, and the yellow image is transferred onto the recording sheet P by the transfer electrode 314. Next, the photoreceptor drum 305 to which the electric charge is given by the charging electrode, is exposed by the exposure means 307 by which the exposure control by the duty ratio is conducted so that the second color toner is superimposed on the recording sheet P, and after that, the color toner of magenta is developed by the developing unit 308, and the color toner of magenta which is formed on the photoreceptor drum is transferred by the transfer electrode 315 so that it is superimposed on the color toner of yellow which has been formed on the recording sheet P. As described above, the image forming process of the present invention is used for two color toners as shown in FIGS. 10 and 11, and is structured in the manner that the amount of the color toner is equally transferred when two colors are superimposed. Further, in the foregoing example, only the case of three primary colors is explained, however, of course, a developing unit using black toner may be added to this system.

Although not shown in the example, the following method may be adopted in which a three color or four color toner image is formed on the photoreceptor drum, and the color image is transferred onto the recording sheet through a transfer drum.

Next, an example of the case where, as the first adjustment means, that is, color tone adjustment, the imagewise exposure is conducted by pulse width modulation, and an example of the case where, as the second adjustment means, that is, an adjustment means which controls imagewise exposure in the manner that the image wise exposure of the isolated dot or edge is different from that of other areas (hereinafter called a dot adjustment means), the imagewise exposure is conducted by pulse width modulation, will be explained as follows.

For example, in the case where the original color is red, when the intensity of the first color is desired to be lower than that of the reference color tone of yellow, the imagewise exposure is adjusted in the manner that the duty ratio of the first color of the solid image is 20%, that of the second color is 100%, and the duty ratio of the first color of the edge image is 50%, and that of the second color is 100%. On the contrary, when the intensity of the first color is desired to be higher than that of the reference color tone, the imagewise exposure is adjusted in the manner that the duty ratios of the first and second colors of the solid image are 100%, and the duty ratios of both the first and second colors of the edge image are 100%. Table 1 will be explained as follows.

TABLE 1

| Image | Colors | Intensity of Colors | | |
| --- | --- | --- | --- | --- |
| | | First Color: Low | Reference | First Color: High |
| Edge | First Color | 50 | 80 | 100 |
| | Second Color | 100 | 100 | 100 |
| Solid | First Color | 20 | 60 | 100 |
| | Second Color | 100 | 100 | 100 |

When values in the table are used, color tone difference between the line of the dot image area, and the solid image area is reduced almost completely.

This adjustment is conducted by a knob on an operation panel or a signal from the host unit 100. Although the foregoing has been explained as a system using three steps, it may be changed continuously.

When the foregoing adjustment is used, the color image can be formed by desired colors.

Next, a structure of a printer apparatus in which the process of the foregoing image forming apparatus is used, will be explained as follows.

In FIG. 6, numeral 1 is a lower frame of the image forming apparatus. A half-moon-shaped sheet feed roller 2 by which a recording sheet P, which is a transfer body, is fed is provided in the lower frame, and a sheet feed cassette 3 in which a plurality of recording sheets P are loaded is detachably provided in the lower frame 1. A push-up plate 4 which is pushed up by a spring 5 is provided in the sheet feed cassette 3, the recording sheets P are loaded on the plate 4, and a separation claw 6, which is rotatably provided to a portion of the sheet feed cassette 3, is engaged with the uppermost portion of tips of the recording sheets P. Numeral 7 is a guide plate by which both sides of the recording sheet P are guided, and which is adjustably provided depending on the size of the recording sheet. The aforementioned structures are provided in the sheet feed cassette 3. Numeral 8 is a conveyance roller for the recording sheet P which is provided in the lower frame 1, and provided between the guide plate 9, by which the leading edge of the recording sheet P fed by the sheet feed roller 2 is guided, and a reversal guide plate 10.

Numeral 11 is a guide plate which guides the recording sheet P to a registration roller 12 after the recording sheet P is reversely fed. Numeral 13 is a swing member by which a sensor $S_1$, which is used for detecting the recording sheet P at the position of the registration roller 12, is turned ON and OFF. Numeral 14 is a guide plate by which the recording sheet P is guided in the direction of a transfer belt 15 after the recording sheet P has passed the registration roller 12, and the transfer belt 15 is stretched around a transfer roller 16, a roller 17, and a drive roller 18. Numeral 15a is a cleaning means by which the surface of the transfer belt 15 is cleaned. Numeral 19 is a fixing unit by which an image, which has been transferred onto the recording sheet P, is fixed, and which is composed of a thermal fixing roller 20 and a pressure contact roller 21, and the thermal fixing roller 20 is contacted with a cleaning roller 20a with pressure, and is cleaned when it is rotated. Numeral 22 is a sheet delivery roller by which the recording sheet P is delivered from the fixing unit 19, and a swing member 23, by which a sensor $S_2$ is turned ON and OFF so that the delivery of the recording sheet P can be ensured, is actuated by the recording sheet P when it is delivered. A delivery sheet tray 28 is structured so that the recording sheet P is delivered on the delivery sheet tray 28 which is provided on almost the entire surface of the upper portion of an upper frame 1c, by a recording sheet guide member 24, a guide path 25 which is formed on the upper frame 1c, and conveyance rollers 26 and 27. An image carrier 29 for image formation, (which will be called a photoreceptor drum 29, hereinafter), is provided to an almost central portion of the upper frame 1c, and a developing unit frame 30a is provided in the manner that: four pairs of developing units 30, 31, 32, and 33 can be located from the above along the surface of the photoreceptor drum 29. Numeral 34 is a polygonal mirror by which laser beams irradiated from a laser beam source (not shown in the drawing) are passed through an f$\theta$ lens 35, and the laser beams are reflected by reflection mirrors 36, 37, and 38, to expose the photoreceptor drum 29. Numeral 39 is an optical system frame into which an optical system composed of the polygonal mirror 34, and reflection mirrors 36, 37, and 38, are integrally assembled, and which is assembled into the uppermost portion of the upper frame 1c.

Numeral 40 is a charging electrode by which the entire surface of the photoreceptor drum 29 is charged, and is provided in a portion of the upper frame 1c. Numeral 41 is a cleaning blade by which residual developers, which adhere to the surface of the photoreceptor drum 29, are cleaned after the image has been transferred onto the recording sheet P from the photoreceptor drum 29. A conveyance unit 43, by which the scraped developer is received and delivered to the outside of a cleaning unit, is provided, and a developer receiving member 42, by which the developer scraped off by the cleaning blade is effectively sent to the conveyance unit 43, is provided to the lower portion of the cleaning blade 41. The developer conveyed to the outside of the cleaning unit by the conveyance unit 43, is conveyed by a conveyer 45 to a container 44, which is structured so that a proper amount of the developer can be accumulated in the container, arid the container can be disposed of when it is detached from the apparatus. Numeral 46 are developer containers by which developers are supplied to the developing units 30, 31, 32, and 33, and four pairs of the developer containers are provided in parallel in the apparatus although only one pair of the developer containers is shown in the drawing. The developer containers are structured in the manner that color developers of, for example, cyan, magenta, yellow, and black are supplied respectively to the developing units 30, 31, 32, and 33 so that color development can be conducted. Numeral 47 is a hand feeding unit from which the recording sheet P is supplied by manual feeding. The lower frame 1 and the upper frame 1c are assembled around a support shaft 1b so that a conveyance path of the recording sheet P can be opened. When recording sheet P is not properly conveyed, and the recording sheet P does not arrive at least at the fixing unit 19, the upper frame 1c can be opened around the support shaft 1b, so that the recording sheet can be removed. A guide plate 1a is provided by which the recording sheet P located in the lower frame 1 can be supplied from another sheet feed unit (not shown in the drawing).

The photoreceptor drum 29 is provided to a frame 41a to which the cleaning blade 41 is provided, through a support shaft 29a, which is supported by the upper frame 1c.

In the foregoing image forming apparatus, when an image signal by which a laser beam source 35 is modulated, is outputted from the host unit 100 through the printer controller 101, as shown in FIG. 2a, the surface of the photoreceptor drum 29 which is charged by the charging electrode 40 is imagewise exposed. This imagewise exposure is for the first color as shown in FIG. 1(b).

Next, yellow toner is developed by the developing unit 30 as the first color, and charged again by the charging electrode 40 as shown in FIG. 1(d), and after the second imagewise exposure has been conducted by the laser beam source as shown in FIG. 1(e), magenta toner is superimposed on the yellow toner and developed by the developing unit 31.

In the same manner as described above, when cyan toner as the third color, and black toner as the fourth color are superimposed successively on the aforementioned color toners, charged again, imagewise exposed, and developed, the color toner image having four colors is formed on the surface of the photoreceptor drum 29.

A gap between the photoreceptor and the development agent carrier (which will be called DSD, hereinafter) is about 0.2 mm to 0.8 mm, wherein a two-component developer composed of a mixture of a carrier which is made of magnetic particles, and toner which is made of non-magnetic particles, is used as a developer.

Weight average particle size of carrier is 15 to 80 $\mu$m in this example, and preferably 20 to 50 $\mu$m, and that of toner is 5 to 20 $\mu$m. Thickness of a developer layer is regulated to a predetermined value on the developer carrier by a layer thickness regulating means. The layer thickness is preferably slightly thinner than the gap between the photoreceptor and the developer carrier. The developer carrier consists of a conductor or a conductor on the surface of which an insulation layer is provided, and a D.C. or an A.C. electric field is given between the carrier and the photoreceptor as a developing bias.

As described above, charging, imagewise exposing, and developing are conducted successively on the surface of the rotating photoreceptor drum 29, color toners are superimposed on each other, a toner image, which is exactly formed into a color image by exposure control, is transferred onto the recording sheet P by the transfer belt 15, and the toner image is fixed on the recording sheet P by the fixing unit 19.

Next, another color tone adjustment method will be explained as follows.

Reversal development is used in this example. Surface potential of the photoreceptor is −50 V on the imagewise exposed portion, and 750 V on the non-exposed portion, that is, a white background portion. Developing bias voltage for each color is D.C. −600 V, and A.C. 2.5 kV p-p. When D.C. or A.C voltage is increased, development is promoted. Accordingly, for example, when it is desired to emphasize yellow, developing bias voltage for yellow is preferably increased.

When developing is conducted by a two-component developer composed of a carrier in which resin coating is conducted on a ferrite core by insulating carriers of a weight average particle size of 45 μm, and insulating toner of a weight average particle size of 8 μm, using the foregoing color developing unit, developing is conducted under the developing bias voltage whose values are set as follows. When color toners of yellow, magenta, and cyan are used, the developing bias voltage is shown in Table 2 as the first adjustment means, where A.C. voltage of the developing bias is Vac, its frequency is fac, and D.C. voltage is Vdc.

TABLE 2

|  | 1st Adjustment Means<br>Developing Bias Voltage →<br>Voltage after Adjustment |
| --- | --- |
| Yellow | Vac = 2.5 kV → 1.5 kV<br>fac = 5 kHz → 5 kHz<br>Vdc = 600 V → 600 V |
| Magenta | Vac = 2.5 kV → 2.5 kV<br>fac = 5 kHz → 5 kHz<br>Vdc = 600 V → 600 V |
| Cyan | Vac = 2.5 kV → 2.5 kV<br>fac = 5 kHz → 5 kHz<br>Vdc = 600 V → 600 V |

As the second adjustment means, the duty ratio of the pulse width of exposure by laser beams with respect to yellow is shown in Table 3.

TABLE 3

| Toner | Image | 1st Color Before adjustment | 1st Color After adjustment | 2nd Color Before adjustment | 2nd Color After adjustment | Monochrome Before adjustment | Monochrome After adjustment |
| --- | --- | --- | --- | --- | --- | --- | --- |
| Yellow | Dot | 60 → 80 | | 70 → 70 | | 80 → 100 | |
| Yellow | Solid | 30 → 30 | | 100 → 100 | | 100 → 100 | |

Next, developing bias voltage of yellow, magenta, and cyan is shown in Table 4 as another first adjustment means in contrast to the first adjustment means in Table 1.

TABLE 4

|  | 1st Adjustment Means<br>Developing Bias Voltage →<br>Voltage after Adjustment |
| --- | --- |
| Yellow | Vac = 2.5 kv → 2.5 kV<br>fac = 5 kHz → 5 kHz<br>Vdc = 600 V → 600 V |
| Magenta | Vac = 2.5 kV → 1.5 kV<br>fac = 5 kHz → 5 kHz<br>Vdc = 600 V → 600 V |
| Cyan | Vac = 2.5 kV → 2.5 kV<br>fac = 5 kHz → 5 kHz<br>Vdc = 600 v → 600 V |

As the second adjustment means, the duty ratio of the pulse width of exposure by laser beams in the case of magenta is shown in Table 5.

TABLE 5

| Toner | Image | 1st Color Before adjustment | 1st Color After adjustment | 2nd Color Before adjustment | 2nd Color After adjustment | Monochrome Before adjustment | Monochrome After adjustment |
| --- | --- | --- | --- | --- | --- | --- | --- |
| Magenta | Dot | 60 → 80 | | 70 → 70 | | 80 → 100 | |

TABLE 5-continued

| Toner | Image | 1st Color Before adjustment | 1st Color After adjustment | 2nd Color Before adjustment | 2nd Color After adjustment | Monochrome Before adjustment | Monochrome After adjustment |
| --- | --- | --- | --- | --- | --- | --- | --- |
| Magenta | Solid | 30 → 30 | | 100 → 100 | | 100 → 100 | |

Figure 7A:
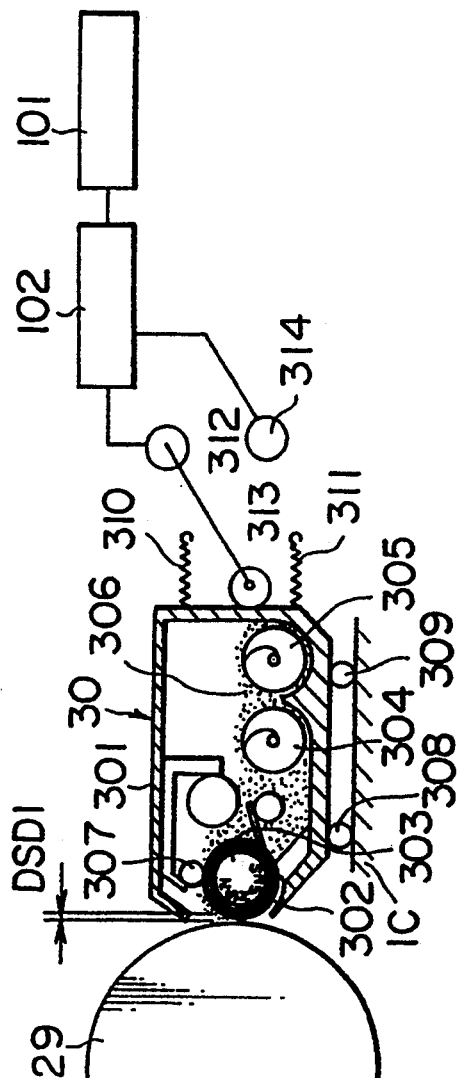
FIGS. 7(a) and 7(b) are sectional views of a developing unit which is movable and by which color toner development is conducted.

When the amount of exposure is controlled by pulse width modulation control of the semiconductor laser, and color tone of the color image is adjusted, the color image can be formed on the recording sheet P by a laser printer. Further, as a color image adjustment method of another example of the present invention, as shown in FIG. 7(a), when a gap between a developing sleeve of the developing unit and the image carrier is adjusted, colors of the color image can be adjusted. That is, a developing sleeve 302 is rotatably provided to the position opposing the image carrier 29 in a developing unit frame body 301 which is composed of a developing unit 30, and magnets 303 having N and S poles are provided in the developing sleeve 302. Numerals 304, 305 are stirring members which stir a developer 306 contained in the developing unit frame body 301, and the thickness and amount of the stirred developer 306, which is conveyed by the developing sleeve 302, is regulated to be constant by a conveyance regulating member 307. The conveyed developer 306 is held so that it can have a constant gap DSD1 between the developing sleeve 302 and the image carrier 29 as shown in the drawing. Its holding mechanism is structured in the following manner: for example, the developing unit frame body 301 is placed on rollers 308 and 309 which are provided to a portion of an upper support frame 1c of the control means 102 as shown in FIG. 7(a); the developing unit frame body 301 is provided so that it can move freely with respect to the upper support frame 1c; the developing unit frame body 301 is always elastically supported by springs 310 and 311 in the direction in which the developing sleeve 302 is separated from the image carrier 29; and further, as shown in FIG. 7(a), the developing unit frame body 301 is blocked by the surface of a cam member 313 which is interlocked with a driving means 312.

When image control is conducted using the developing unit 30 structured as described above, in the video signal outputted from the printer controller 101 shown in FIG. 2(b), characters and lines are outputted as dot signals, and the solid image area is outputted as the solid image, and they are outputted after their edge areas are detected.

When the first color duty ratio of the solid image area is 60%, the second color duty ratio thereof is 100%, the first color duty ratio of the edge area is 80%, and the second color duty ratio thereof is 100%, there is almost no color tone difference between the dot image and the line and solid image. Therefore, for example, when it is desired to emphasize yellow as compared with red and green, it can be conducted by reducing DSD of the developing unit of yellow from 0.6 mm to 0.5 mm. For this operation, the driving means 312 is driven, and the developing unit frame body 301 is pushed by the surface of the cam member 313 against the spring force of springs 301 and 311, so that DSD1 between the image carrier 29 and the developing sleeve 302 can be reduced to the aforementioned value. In this case, the duty ratio of the solid image area is not changed, and the first color duty ratio of the edge area is adjusted to be 60%, and the second color duty ratio thereof is adjusted to be 100%. Due to this adjustment, there is almost no color tone difference between the dot image area and the line and solid image area.

Due to the foregoing operations, the desired color can be obtained.

Figure 7B:
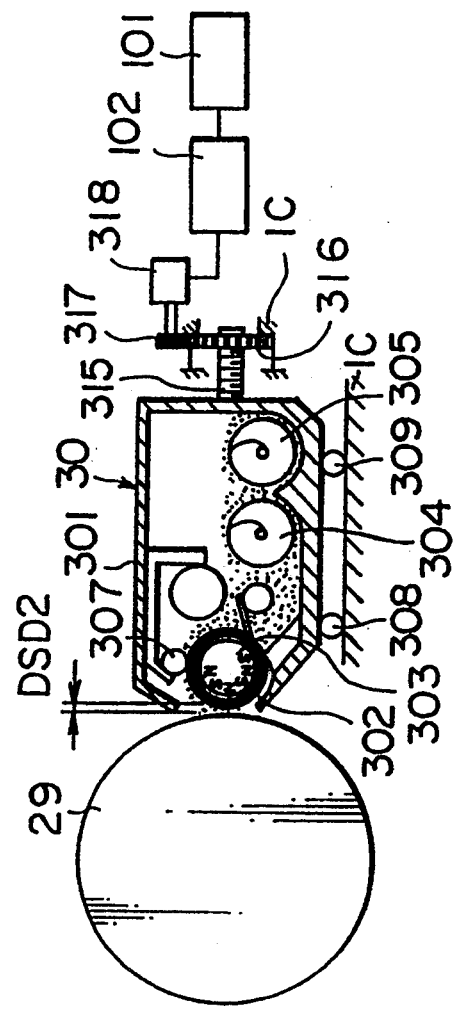

Next, the example in FIG. 7(b) will be explained as follows. FIG. 7(b) is another example of FIG. 7(a), and a male screw rod 315 is provided to a portion of the developing unit frame body 301 in the manner that the male screw rod 315 is protruded in the moving direction of the developing unit frame body 301, and is engaged with a gear 316 on which a male screw is provided. The gear 316 is engaged with a pinion 317, and a driving means 318 is provided to the pinion 317 in the manner that they are directly coupled. The gear 316 is structured so that it is rotatably provided with respect to a portion of the upper support frame 1c, and its movement in the left or right direction can be blocked. As described above, numeral 101 is the printer controller, and numeral 102 is the control section of the laser printer.

In the example, the pinion 317 is rotated by rotation of the driving means 318, and gear 316 is rotated therewith. The gear 316 is rotatably provided so that it can only be rotated in the upper frame 1c, and therefore, the male screw rod 315 is slightly moved in either left or right directions in the drawing when the gear 316 is rotated clockwise or counterclockwise. Accordingly, when the developing sleeve 302 is moved with the developing unit frame 301 with which the sleeve 302 is integrally provided, a gap DSD2 between the image carrier 29 and the developing sleeve 302 can be changed. Due to this structure, DSD2 Can be slightly adjusted, and rapid response is possible with respect to the image signal. Due to the foregoing DSD (gap) adjustment, the color adjustment as explained in FIG. 7(a) is possible.

Figure 8:
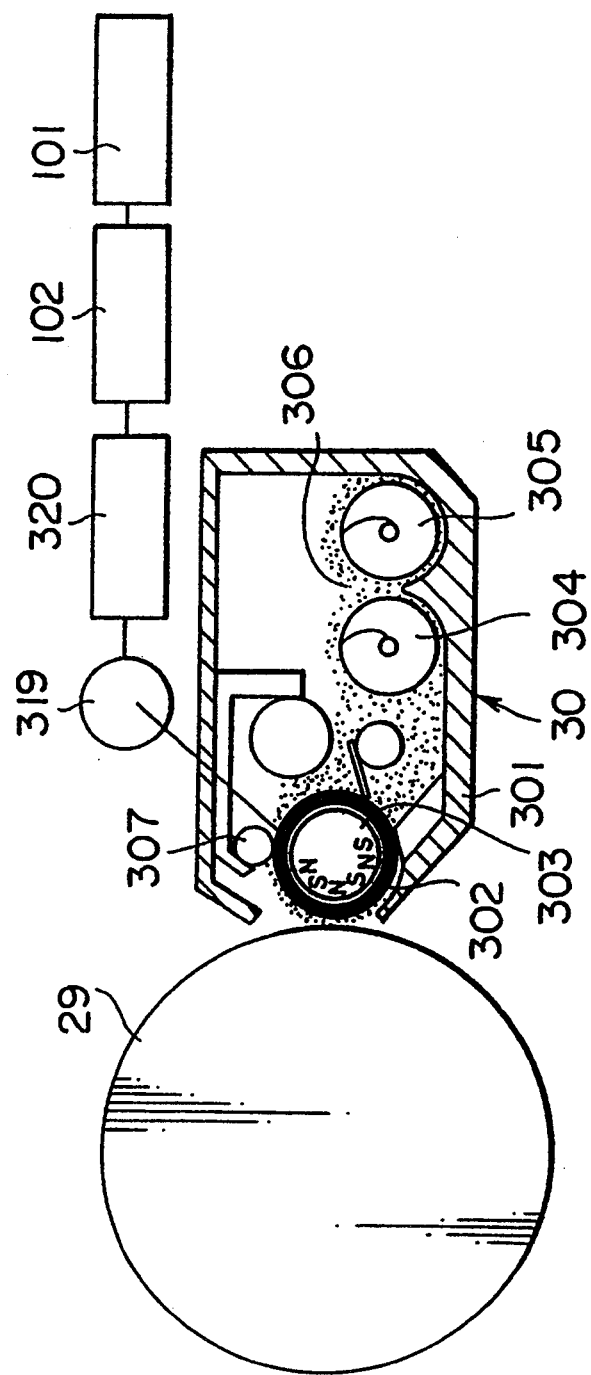
FIG. 8 is a sectional view showing a color toner developing means by which the number of revolutions of a developing sleeve of the developing unit of the present invention is changed and color toner development is conducted.

Next, the example shown in FIG. 8 will be explained as follows. The example will be explained using the same example as the foregoing developing unit 30. The rotating developing sleeve 302 is provided to the opening of the developing unit frame body 301, magnets 303 having N and S poles are provided in the developing sleeve 302. Numerals 304 and 305 are stirring members which are provided in the developing unit frame body 301 and stir the developer. Numeral 319 is a driving source by which the developing sleeve 302 is rotated, and is connected with the printer controller 101 through a rotation control means 320 by which rotation of the driving source is controlled, and the laser printer control means 102.

When the image is controlled using the developing unit 30 structured in the manner described above, characters and lines are outputted as a dot signal in a video signal outputted from the printer controller 101 shown in FIG. 2, and the solid image area is outputted as a solid image signal. The dot signal and the solid image signal are outputted after the edge area has been detected. As explained in the examples in FIGS. 7(a) and 7(b), there is no color tone difference between the dot image and the line and solid image when the first color duty ratio of the solid image is 60%, the second color duty ratio is 100%, the first color duty ratio of the edge area is 80%, and the second color duty ratio thereof is 100%.

In this example, in order to conduct the color adjustment, the laser printer control means 102 receives signals of the dot and solid image areas, and controls the driving source 319 through the rotation control means 320. Accordingly, the rotation of the developing sleeve 302 is controlled by the dot and solid image areas.

In this case, for example, when it is desired to emphasize yellow as compared with red or green as shown in the examples in FIGS. 7(a) and 7(b), a line speed ratio of the image carrier to the developing sleeve 302 is reduced from 3 to 2, thereby the supply of the developer is reduced. At the time, the duty ratio of the solid image area is not changed, and that of the edge area is adjusted as follows: the first color duty ratio is 60%, and the second color duty ratio is 100%. As a result of the foregoing, there is no color tone difference between the dot image and the line and solid image, so that the color can be adjusted almost perfectly.

Figure 9:
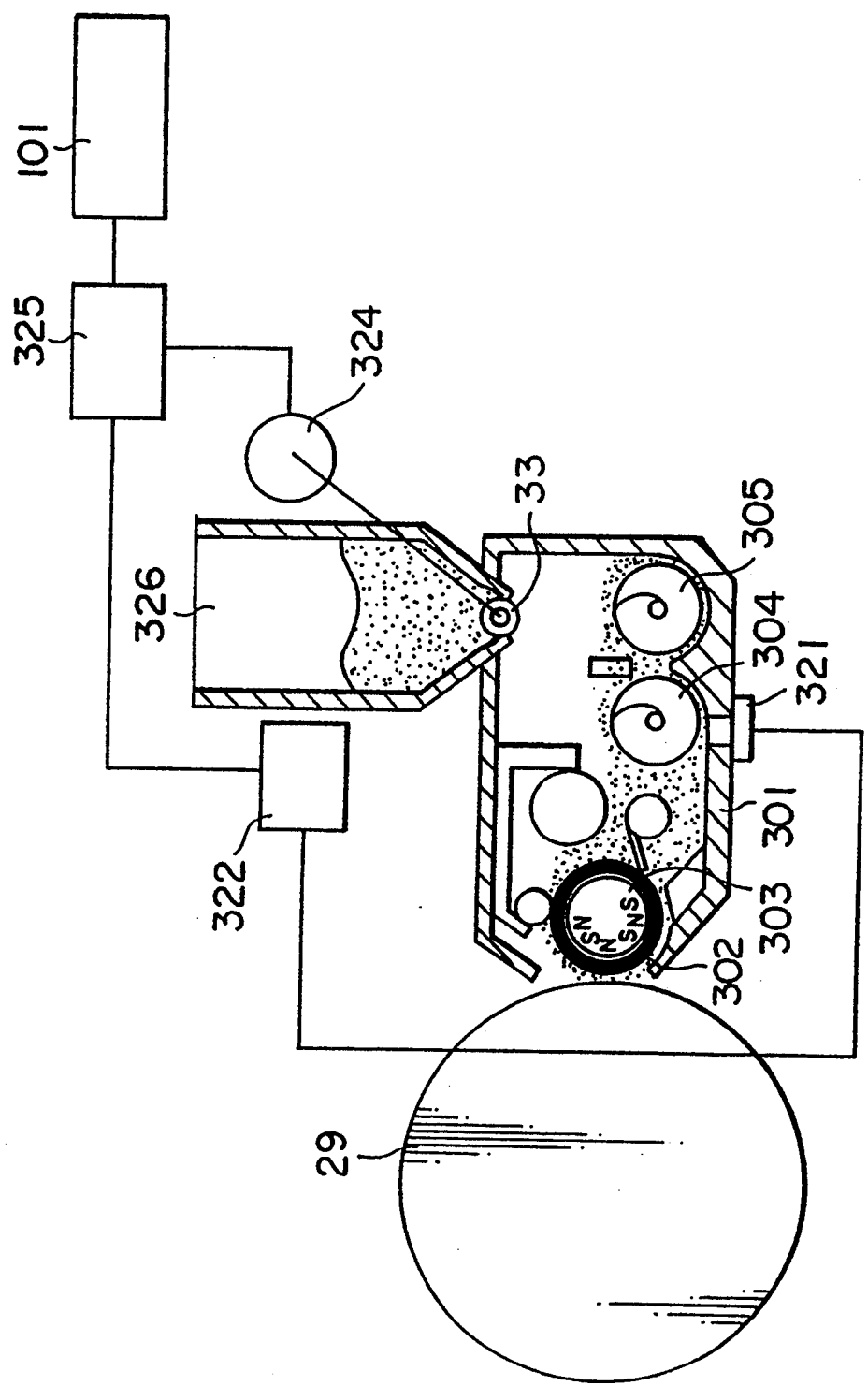
FIG. 9 is a sectional view showing a color toner developing means by which an amount of toner of the developing unit of the present invention is controlled.

Next, the example in FIG. 9 will be explained as follows.

A toner density control means 321 which detects toner density and controls it, is provided to the developer supply side of the developing sleeve 302 which supplies toner to the image carrier 29, and an image density adjustment means 325 is provided which is structured in the following manner: toner density data is inputted into the image density adjustment means 325 through an input/output means 322 into which the signal detected by the toner density control means 321 is inputted, and toner density is adjusted by the image density adjustment means 325; and image information is inputted from the printer controller 101. The image density adjustment means 325 is connected with a driving means 324 which drives a toner replenishment means 323 provided to a toner hopper 326.

The developing unit 30 is structured in the same way as the aforementioned, and therefore an explanation is omitted. In the example structured as stated above, a video signal outputted from the printer controller 101 is detected whether it belongs to an isolated dot image area, or whether it belongs to an edge area. The dot image area and edge area are discriminated from the solid image area and a discrimination signal is outputted from the printer controller 101, and the signal is inputted into the image density adjustment means 325.

As described above, when the first color duty ratio of the solid image area is 60%, the second color duty ratio thereof is 100%, the first color duty ratio of the edge area is 80%, and the second color duty ratio thereof is 100%. In the case where reference color adjustment is conducted, there is no color tone difference between the dot image and the line and solid image. In this case, for example, when it is desired to emphasize yellow as compared with red or green, color toner density of the developing unit of yellow, as shown in FIG. 6, to carrier is increased from 8% to 10%. At that time, when the duty ratio of the solid image area is not changed, and the color toner is adjusted so that the first color duty ratio of the edge area is 60%, and the second color duty ratio thereof is 100%, there is no color tone difference between the dot image and the line and solid image, so that color adjustment can be conducted almost perfectly.

That is, when it is desired to increase density of yellow as described above, toner density in the developing unit 30 of yellow is increased. In this case, in the same manner as in the foregoing example, duty ratios of the first and second colors of the edge area, and those of the first and second colors of the solid image area are appropriately selected so that color tone of the dot image, the solid image and lines is not changed.

In the foregoing examples, the color image forming method by two color toner development is explained. Needless to say, image formation control by more than three colors or monochrome can be applied to all the foregoing examples. In this case, when the duty ratio of the dot image area is replaced with that of the solid image area, blocking or breakage of the image is eliminated, and image density of the solid image area can be adjusted.

In the foregoing examples, only exposure by laser beams has been explained as the exposure means of the present invention, however, exposure by an LED array, or a liquid crystal may be used. Any exposure means can control an adhered amount of toner by pulse width modulation, or the intensity modulation method. In the foregoing examples, the first adjustment means is conducted by changing imagewise exposure, or developing conditions, however, it may be conducted by changing other conditions, for example, the charging condition.

In the present invention, when a monochromatic image is reproduced, a line image, a dot, and an edge of a solid image area can be finely reproduced in the same manner as in the solid image area. Especially, a reproduced image of a mixed image of a black line and dot image, and solid image can have high image quality. As described above, when exposure is conducted by a light source composed of a laser beam, an LED array, or a liquid crystal corresponding to an image outputted from a CPU or an image memory so that color toner can be developed, the present invention has the following effects: an accurate color image can be formed when the first color and second color developments are conducted using a plurality of developing units, and a developing operation by the developing units is controlled thereby; and color images in various forms, such as the dot image or the line and solid image, can be reproduced in accurate colors.

What is claimed is:

1. A color image forming apparatus comprising:
   (a) first exposure control means for controlling an imagewise dot exposure means to form a first latent dot image with a first amount of exposure on an image carrier;
   (b) first developing means for developing said first latent dot image to form a first colored toner dot image on said image carrier;
   (c) second exposure control means for controlling said imagewise dot exposure means to form a second latent dot image with a second amount of exposure on said image carrier;
   (d) second developing means for developing said second latent dot image to form a second colored toner dot image on said image carrier;
   (e) first adjusting means for adjusting a ratio of said first amount of exposure to said second amount of exposure by controlling said first and second exposure control means;
   (f) discriminating means for discriminating one of an isolated dot image and a dot image at an edge of a solid image a first area from a second area that excludes said first area, said discriminating means providing a discriminating output signal which is representative of a discriminating result ascertained by said discriminating means;
   (g) first control means for controlling said first adjusting means in response to said discriminating output signal so that an exposure ratio for the first area differs from an exposure ratio for the second area;
   (h) second adjusting means for adjusting an adhesion amount of toner of at least one of said first colored toner dot image and said second colored toner dot image; and
   (i) second control means for controlling said first adjusting means in response to said discriminating output signal so that a color tone in said first area and a color tone in said second area are substantially equal to each other, when said second adjusting means adjusts said adhesion amount of toner.

2. The apparatus of claim 1, wherein said first and second colored toner dot images are sequentially registered on said image carrier.

3. The apparatus of claim 1, wherein said first and second exposure control means comprise means for changing a light intensity of said imagewise dot exposure means so as to change said first and second amounts of exposure.

4. The apparatus of claim 1, wherein said first and second exposure control means comprise pulse width modulating means for changing said first and second amounts of exposure.

5. The apparatus of claim 1, wherein said imagewise dot exposure means comprises a laser beam exposure means.

6. The apparatus of claim 1, wherein said imagewise dot exposure means comprises a light emission diode array.

7. The apparatus of claim 1, wherein said imagewise dot exposure means comprises a liquid crystal shutter.

8. The apparatus of claim 1, wherein said first and second colored toner dot images are sequentially transferred to a transferring body.

9. The apparatus of claim 1, wherein said second adjusting means adjusts at least one of said first and second exposure control means.

10. The apparatus of claim 1, wherein said second adjusting means adjusts a distance between said image carrier and a developing sleeve of at least one of said first and second developing means.

11. The apparatus of claim 1, wherein said second adjusting means adjusts a rotation of a developing sleeve of at least one of said first and second developing means.

12. The apparatus of claim 1, wherein said second adjusting means adjusts a bias voltage applied to a developing sleeve of at least one of said first and second developing means.

13. The apparatus of claim 1, wherein said second adjusting means adjusts a toner concentration of at least one of said first and second developing means.

14. The apparatus of claim 1, wherein said second adjusting means adjusts an electric charger for said image carrier.

15. The apparatus of claim 1, wherein the discriminating means includes means for discriminating a matrix having N×M dots.

16. A color image forming apparatus comprising:
   (a) first exposure control means for controlling a first imagewise dot exposure means to form a first latent dot image with a first amount of exposure;
   (b) first developing means for developing said first latent dot image to form a first colored toner dot image;
   (c) second exposure control means for controlling a second imagewise dot exposure means, which is different from said first imagewise dot exposure means, to form a second latent dot image with a second amount of exposure;

(d) second developing means for developing said second latent dot image to form a second colored toner dot image;

(e) first adjusting means for adjusting a ratio of said first amount of exposure to said second amount of exposure by controlling said first and second exposure control means;

(f) discriminating means for discriminating one of an isolated dot image and a dot image at an edge of a solid image in a first area from a second area that excludes said first area, said discriminating means providing a discriminating output signal which is representative of a discriminating result ascertained by said discriminating means;

(g) first control means for controlling said first adjusting means in response to said discriminating output signal so that an exposure ratio for the first area differs from an exposure ratio for the second area;

(h) second adjusting means for adjusting an adhesion amount of toner of at least one of said first colored toner dot image and said second colored toner dot image; and (i) second control means for controlling said first adjusting means in response to said discriminating output signal so that a color tone in said first area and a color tone in said second area are substantially equal to each other, when said second adjusting means adjusts said adhesion amount of toner.

17. The apparatus of claim 16, wherein said first and second colored toner dot image are sequentially registered on a common image carrier.

18. The apparatus of claim 16, wherein:
said first colored toner dot image is formed on a first image carrier and said second colored toner dot image is formed on a second image carrier which is different from said first image carrier; and
said first and second colored toner dot images are sequentially transferred to a transferring body.

19. A color image forming apparatus comprising:
(a) first exposure control means for controlling an imagewise dot exposure means to form a first latent dot image with a first light intensity on an image carrier;

(b) first developing means for developing said first latent dot image to form a first colored toner dot image on said image carrier;

(c) second exposure control means for controlling said imagewise dot exposure means to form a second latent dot image with a second light intensity, said image carrier having said first colored toner dot image registered thereon;

(d) second developing means for developing said second latent dot image to form a second colored toner dot image on said image carrier, said image carrier having said first and second colored toner dot images registered thereon;

(e) first adjusting means for adjusting at least one of said first light intensity and said second light intensity by controlling said first and second exposure control means;

(f) discriminating means for discriminating one of an isolated dot image and a dot image at an edge of a solid image in a first area from a second area that excludes said first area, said discriminating means providing a discriminating output signal which is representative of a discriminating result ascertained by said discriminating means;

(g) first control means for controlling said first adjusting means in response to said discriminating output signal so that an adhesion amount of said first colored toner dot image and an adhesion amount of said second colored toner dot image are substantially equal to each other regardless of said first area therein and said second area therein;

(h) second adjusting means for adjusting a developing condition of at least one of said first developing means and said second developing means; and (i) second control means for controlling said first adjusting means in response to said discriminating output signal so that a color tone in said first area and a color tone in said second area are substantially equal to each other, when said second adjusting means adjusts said developing condition.

20. The apparatus of claim 19, wherein said second adjusting means adjusts a distance between said image carrier and a developing sleeve of at least one of said first and second developing means.

21. The apparatus of claim 19, wherein said second adjusting means adjusts a rotation of a developing sleeve of at least one of said first and second developing means.

22. The apparatus of claim 19, wherein said second adjusting means adjusts a bias voltage applied to a developing sleeve of at least one of said first and second developing means.

23. A color image forming apparatus comprising:
(a) first exposure control means for controlling an imagewise dot exposure means to form a first latent dot image with a first amount of exposure on an image carrier;

(b) first developing means for developing said first latent dot image to form a first colored toner dot image on said image carrier;

(c) second exposure control means for controlling said imagewise dot exposure means to form a second latent dot image with a second amount of exposure on said image carrier;

(d) second developing means for developing said second latent dot image to form a second colored toner dot image on said image carrier;

(e) adjusting means for adjusting a ratio of said first amount of exposure to said second amount of exposure by controlling said first and second exposure control means;

(f) discriminating means for discriminating one of an isolated dot image and a dot image at an edge of a solid image in a first area from a second area that excludes said first area, said discriminating means providing a discriminating output signal which is representative of a discriminating result ascertained by said discriminating means; and (g) control means for controlling said adjusting means in response to said discriminating output signal so that an exposure ratio for the first area differs from an exposure ratio for the second area.

24. The apparatus of claim 23, wherein said first and second exposure control means comprise means for changing a light intensity of an imagewise dot exposure means so as to change said first and second amounts of exposure.

25. The apparatus of claim 23, wherein said first and second exposure control means comprise pulse width modulating means for changing said first and second amounts of exposure.

26. The apparatus of claim 23, wherein said first and second colored toner dot images are sequentially registered on said image carrier.

27. The apparatus of claim 23, wherein said first and second colored toner dot images are sequentially transferred to a transferring body.

28. The apparatus of claim 23, wherein the discriminating means includes means for discriminating a matrix having N×M dots.

29. The apparatus of claim 23, wherein said imagewise dot exposure means comprises a laser beam exposure means.

30. The apparatus of claim 23, wherein said imagewise dot exposure means comprises a light emission diode array.

31. The apparatus of claim 23, wherein said imagewise dot exposure means comprises a liquid crystal shutter.

32. A color image forming apparatus comprising:
(a) first exposure control means for controlling a first imagewise dot exposure means to form a first latent dot image with a first amount of exposure;
(b) first developing means for developing said first latent dot image to form a first colored toner dot image;
(c) second exposure control means for controlling a second imagewise dot exposure means, which is different from said first imagewise dot exposure means, to form a second latent dot image with a second amount of exposure;
(d) second developing means for developing said second latent dot image to form a second colored toner dot image;
(e) adjusting means for adjusting a ratio of said first amount of exposure to said second amount of exposure by controlling said first and second exposure control means;
(f) discriminating means for discriminating one of an isolated dot image and a dot image at an edge of a solid image in a first area from a second area that excludes said first area, said discriminating means providing a discriminating output signal which is representative of a discriminating result ascertained by said discriminating means; and
(g) control means for controlling said adjusting means in response to said discriminating output signal so that an exposure ratio for the first area differs from an exposure ratio for the second area.

33. The apparatus of claim 32, wherein said first and second exposure control means comprise means for changing a light intensity of said first and second imagewise dot exposure means so as to change said first and second amounts of exposure respectively.

34. The apparatus of claim 32, wherein said first and second exposure control means comprise pulse width modulating means for changing said first and second amounts of exposure.

35. The apparatus of claim 32, wherein said first and second colored toner dot images are sequentially registered on a common image carrier.

36. The apparatus of claim 32, wherein:
said first colored toner dot image is formed on a first image carrier and said second colored toner dot image is formed on a second image carrier which is different from said first image carrier; and
said first and second colored toner dot image are sequentially transferred to a transferring body.

37. The apparatus of claim 32, wherein the discriminating means includes means for discriminating a matrix having N×M dots.

38. The apparatus of claim 32, wherein at least one of said first and second imagewise dot exposure means comprises a laser beam exposure means.

39. The apparatus of claim 32, wherein at least one of said first and second imagewise dot exposure means comprises a light emission diode array.

40. The apparatus of claim 32, wherein at least one of said first and second imagewise dot exposure means comprises a liquid crystal shutter.

* * * * *